(12) United States Patent
Zheng et al.

(10) Patent No.: US 8,657,298 B2
(45) Date of Patent: Feb. 25, 2014

(54) BRUSH SEAL WITH BACKING PLATE TOOTH

(75) Inventors: Xiaoqing Zheng, Niskayuna, NY (US); Hemant Vinayak Gedam, Karnataka (IN)

(73) Assignee: General Electric Company, Schenectady, NY (US)

( * ) Notice: Subject to any disclaimer, the term of this patent is extended or adjusted under 35 U.S.C. 154(b) by 87 days.

(21) Appl. No.: 13/209,668

(22) Filed: Aug. 15, 2011

(65) Prior Publication Data

US 2013/0043658 A1 Feb. 21, 2013

(51) Int. Cl.
F16J 15/32 (2006.01)

(52) U.S. Cl.
USPC ........................................................ 277/355

(58) Field of Classification Search
USPC ................................................. 277/355, 411
See application file for complete search history.

(56) References Cited

U.S. PATENT DOCUMENTS

| | | | |
|---|---|---|---|
| 2,474,305 A * | 6/1949 | Ollison ......................... | 241/195 |
| 5,474,305 A | 12/1995 | Flower | |
| 6,077,038 A | 6/2000 | Gail et al. | |
| 6,139,018 A | 10/2000 | Cromer et al. | |
| 6,168,162 B1 | 1/2001 | Reluzco et al. | |
| 6,168,377 B1 | 1/2001 | Wolfe et al. | |
| 6,173,962 B1 | 1/2001 | Morrison et al. | |
| 6,231,047 B1 | 5/2001 | Cunningham et al. | |
| 6,244,599 B1 | 6/2001 | Braun et al. | |
| 6,254,344 B1 | 7/2001 | Wright et al. | |
| 6,416,057 B1 | 7/2002 | Adams et al. | |
| 6,540,231 B1 | 4/2003 | Trantow et al. | |
| 6,550,777 B2 | 4/2003 | Turnquist et al. | |
| 6,589,012 B2 | 7/2003 | Burnett et al. | |
| 6,669,203 B1 | 12/2003 | Mortzheim | |
| 6,695,314 B1 * | 2/2004 | Gail et al. ..................... | 277/355 |
| 6,739,592 B2 * | 5/2004 | Kono ............................ | 277/355 |
| 6,910,858 B2 | 6/2005 | Addis | |
| 7,093,835 B2 | 8/2006 | Addis | |
| 7,270,333 B2 | 9/2007 | Addis | |
| 7,387,301 B2 * | 6/2008 | Rupp et al. .................... | 277/355 |
| 7,410,173 B2 * | 8/2008 | Justak ........................... | 277/355 |
| 7,413,194 B2 * | 8/2008 | Wright et al. ................. | 277/355 |
| 7,438,526 B2 | 10/2008 | Enderby | |
| 7,445,212 B2 | 11/2008 | Gail et al. | |
| 7,461,847 B2 | 12/2008 | Short et al. | |
| 7,516,962 B2 | 4/2009 | Boeck | |

(Continued)

FOREIGN PATENT DOCUMENTS

WO 0223069 A3 3/2002

*Primary Examiner* — Vishal Patel
*Assistant Examiner* — Thomas Neubauer
(74) *Attorney, Agent, or Firm* — Cantor Colburn LLP

(57) ABSTRACT

A brush seal assembly is provided, including a sealing surface, a side plate, a backing plate, a plurality of bristles, and a biasing member. The backing plate is selectively located in a stationary position and has at least one backing tooth and a backing tip. The backing tooth has a tooth surface and the backing tip has a tip surface. A tooth clearance is measured between the tooth surface and the sealing surface. A tip clearance is measured between the tip surface and the sealing surface. The tooth clearance is less than the tip clearance. The bristles are located between the side plate and the backing plate. The bristles include an end portion for sealing to the sealing surface. The biasing member exerts a biasing force upon the backing plate in a direction towards the sealing surface. The backing tooth is configured for selectively contacting the sealing surface.

19 Claims, 2 Drawing Sheets

(56) References Cited

U.S. PATENT DOCUMENTS

| | | |
|---|---|---|
| 7,637,719 B2 | 12/2009 | Graebeldinger |
| 2002/0140175 A1* | 10/2002 | Kono .......................... 277/355 |
| 2003/0141666 A1* | 7/2003 | Crudgington et al. ........ 277/355 |
| 2004/0126227 A1* | 7/2004 | Addis ........................ 415/174.2 |
| 2007/0096397 A1* | 5/2007 | Justak ........................... 277/355 |
| 2011/0121519 A1* | 5/2011 | Justak ........................... 277/412 |

* cited by examiner

BRUSH SEAL WITH BACKING PLATE TOOTH

BACKGROUND OF THE INVENTION

The subject matter disclosed herein relates to a brush seal assembly, and more specifically to a brush seal assembly having a backing plate including at least one backing tooth for selectively contacting a sealing surface.

Brush seals are commonly found in a variety of applications such as gas and steam turbines, and are typically employed to seal a gap located between a rotary shaft and a stationary member. Brush seals have a plurality of bristles that are sandwiched between a forward plate and a backing plate. The bristles extend towards a sealing surface and provide a seal between the rotary shaft and the stationary member.

The backing plate of the brush seal provides axial support to the bristles and also partially obstructs the gap located between the rotary shaft and the stationary member. A clearance is located between the backing plate and the rotary shaft in an effort to substantially prevent the backing plate from contacting the rotary shaft during operation. This clearance is sometimes referred to as the fence height of the backing plate. The fence height of the backing plate is typically more than the conventional metal-to-metal clearance. In an effort to improve brush seal pressure capability and reduce bristle wear, the fence height is reduced such that the bristles have increased support and are subjected to less bending stress from pressure loading. However, reducing fence height may increase the risk of rubbing against the rotary shaft during transient conditions, such as when the system is passing resonant speeds or in the event thermal equilibrium between components is reached. If the fence height is not adequate, the surface of the backing plate that opposes the rotary shaft may mushroom or smear when rubbed by the rotating surface of the rotary shaft during transient conditions.

In the event a backing plate tip is rubbed, the edges of the backing plate may become irregular and intermittent. This may create a difficult situation, as the bristles may not slide easily along on the backing plate. If the bristles are stuck on an irregular edge of the backing plate, the bristles may become permanently bent and worn where there are rotary shaft excursions. Thus, the backing plate should provide axial support to the bristles while still substantially avoiding contact with the rotary shaft.

Several approaches currently exist for reducing or preventing the surface of the backing plate from contacting the rotary member while still maintaining axial support of the bristles. For example, in one approach, the surface of the backing plate is coated with a tribologically compatible coating or backing layer to be more tolerant to rubbing. In another approach, a material that facilitates rubbing between the backing plate and the rotary surface could be employed as well to substantially avoid mushrooming of the backing plate tip. However, these approaches may introduce added cost and complexity to the brush seal. In another approach, the forward plate is set to a relatively tight clearance to serve as a bump element to protect the backing plate, but it is typically not a viable option, because this approach will create a jet flow that may destabilize the brush seal bristles, causing fluttering and relatively quick wear. Therefore, it would be desirable to provide a cost effective system for reducing contact between the backing plate of a brush seal and a rotary shaft.

BRIEF DESCRIPTION OF THE INVENTION

According to one aspect of the invention, a brush seal assembly is provided, including a sealing surface, a side plate, a backing plate, a plurality of bristles, and a biasing member. The backing plate is selectively located in a stationary position and has at least one backing tooth and a backing tip. The backing tooth has a tooth surface and the backing tip has a tip surface. A tooth clearance is measured between the tooth surface and the sealing surface. A tip clearance is measured between the tip surface and the sealing surface. The tooth clearance is less than the tip clearance. The bristles are located between the side plate and the backing plate. The bristles include an end portion for sealing to the sealing surface. The biasing member exerts a biasing force upon the backing plate in a direction towards the sealing surface. The backing tooth is configured for selectively contacting the sealing surface. Contact between the backing tooth and the sealing surface urges the backing plate out of the stationary position and towards the biasing member. The biasing force re-positions the backing plate back to the stationary position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
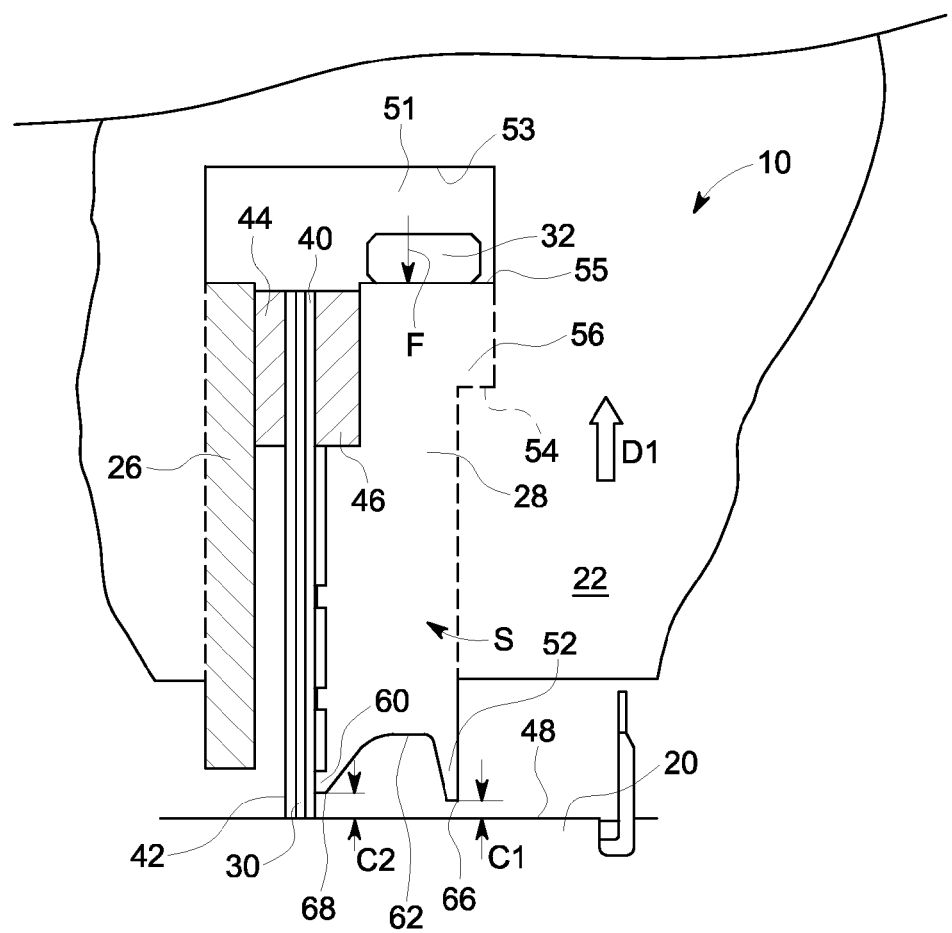
FIG. 1 is an exemplary cross-sectioned view of a brush seal assembly.

FIG. 1 illustrates an exemplary brush seal assembly 10 located between a rotary member 20 and a machine housing 22. The brush seal assembly 10 may be employed in any application requiring sealing between two regions of varying pressure. For example, the brush seal assembly 10 may be in employed in a gas or steam turbine, a compressor, or a pump. The brush seal assembly 10 includes a side plate 26, a backing plate 28, a plurality of sealing bristles 30, and a biasing member 32. The sealing bristles 30 are received between the side plate 26 and the backing plate 28. The seal bristles 30 are typically constructed from stainless steel, Haynes® 25 alloy, or a nickel-cobalt alloy, however it is understood that other materials may be used as well.

The seal bristles 30 have a first end portion 40 and a second end portion 42. The first end portion 40 is received between two siderails 44, 46, where a first siderail 44 is attached to the side plate 26 and the second siderail 46 is attached to the backing plate 28. The siderails 44, 46 exert a compressive force to secure and position the seal bristles 30 in place. In one embodiment the siderails 44, 46 are attached to the seal bristles 30 by welding. The second end portion 42 of the seal bristles 30 are configured to provide sealing to a sealing surface 48 of the rotary member 20. In one embodiment, the second end portion 42 of the seal bristles 30 may contact the sealing surface 48 as the rotary member 20 operates. The sealing bristles 30 may be angled in the direction of rotation. Specifically, referring to FIG. 2, the seal bristles 30 are angled in a direction of rotation R of the rotary member 20.

Figure 2:
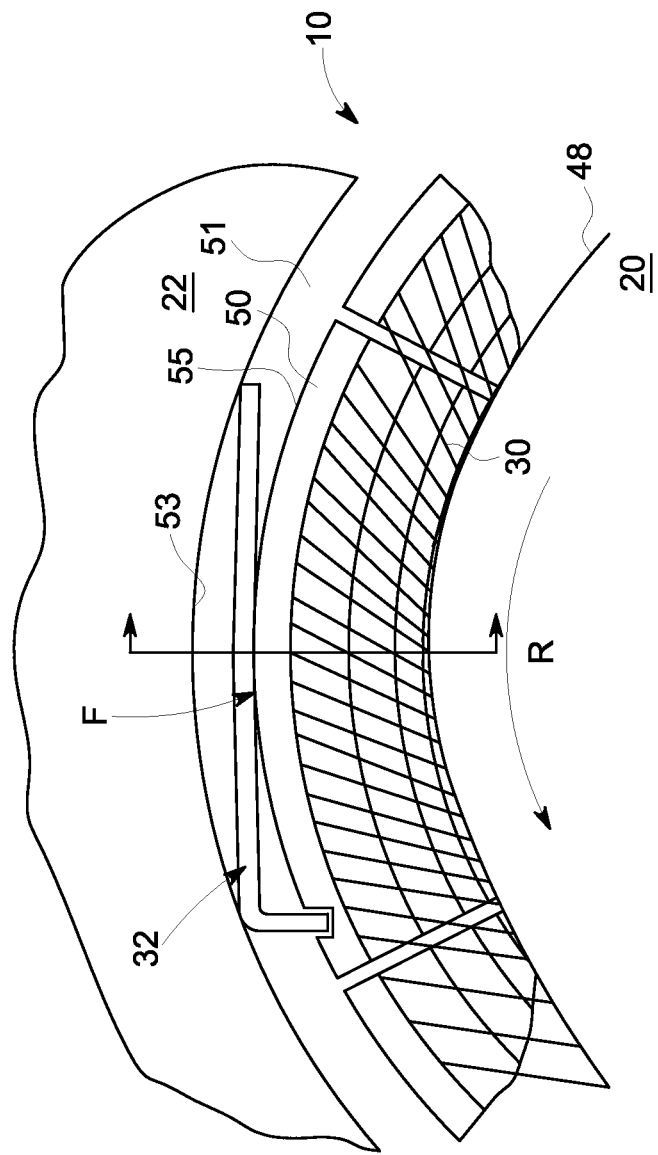
FIG. 2 is a view of a portion of the brush seal assembly illustrated in FIG. 1.

Continuing to refer to FIG. 2, the brush seal assembly 10 includes a generally annular configuration. In one embodiment, the brush seal assembly 10 may include a segmented design, where the plurality of seal bristles 10 are segmented into discrete portions or segments 50 located around the circumference of the brush seal assembly 10. The segments 50 may facilitate assembly of the brush seal assembly 10 between the rotary member 20 and the machine housing 22. The brush seal assembly 10 may include any number of brush seal bristle segments 50, such as, for example, four discrete segments, six discrete segments, or eight discrete segments. Referring to both of FIGS. 1-2, the biasing member 32 is located within a recess 51 of the machine housing 22 between the brush seal assembly 10 and the machine housing 22. The biasing member 32 is placed between a bottom surface 53 of the recess and an upper surface 55 of the backing plate 28. Each segmented portion 50 of the brush seal assembly 10 may have at least one corresponding biasing member 32. In the embodiment as shown, the biasing member 32 is a leaf spring, however it is understood that other types biasing members may be used as well. For example, in another embodiment the biasing member 32 could be a wave spring or a coil spring.

Referring back to FIG. 1, the machine housing 22 includes a hook or shoulder 54, where the shoulder 54 is used to engage with and provide support to a corresponding portion 56 of the backing plate 28. The backing plate 28 includes at least one backing tooth 52 and a backing tip 60. The backing tooth 52 and the tip 60 are both protuberances that each project outwardly from an outer surface 62 of the backing plate 28. The backing tip 60 is positioned along the backing plate 28 to abut against and provide axial support to the seal bristles 30. The backing tooth 52 is positioned closer to the sealing surface 48 of the rotary member 20 than the backing tip 60. Specifically, the backing tooth 52 includes a tooth surface 66 and the backing tip 60 includes a tip surface 68. A tooth clearance C1 is measured between the tooth surface 66 and the sealing surface 48, and a tip clearance C2 is measured between the tip surface 68 and the sealing surface 48. The tooth clearance C1 is less than the tip clearance C2. In one exemplary embodiment, the tooth clearance C1 ranges from about 0.63 millimeters (0.025 inches) to about 3.42 millimeters (0.135 inches), and the tip clearance C2 ranges from about 0.38 millimeters (0.015 inches) to about 3.05 millimeters (0.12 inches). That is, the difference between the tooth clearance C1 and the tip clearance C2 ranges from about 0.25 millimeters (0.010 inches) to about 0.38 millimeters (0.015 inches).

The backing tooth 52 is configured to selectively contact the sealing surface 48 of the rotary member 20. That is, the backing tooth 52 is positioned such that in the event the backing plate 28 comes within proximity of the sealing surface 48 of the rotary member 20, only the backing tooth 52 is configured to contact the sealing surface 48. Thus, contact between backing tip 60 and the sealing surface 48 is generally avoided. The backing tooth 52 of the backing plate 28 typically contacts the sealing surface 48 during a rotary member excursion, which may occur due to thermal transient conditions, or rotor vibration when passing a resonant speed. The functions of the backing tooth 52 are typically two fold. First, the backing tooth 52 generally provides protection to the backing plate tip 68 in the event of rotor excursion or thermal pinching. The second function of the backing tooth 52 is to act as a backup seal.

In the embodiment as shown in FIG. 1, the backing plate 28 is selectively located in a stationary position S. The backing plate 28 remains in the stationary position S during normal operation, until the backing tooth 52 contacts the sealing surface 48 of the rotary member 20 during thermal transient operating conditions such as, for example, startup and shutdown. Contact between the backing tooth 52 and the sealing surface 48 causes the backing plate 28 to be urged out of the stationary position S, and pushes the backing plate 28 in a first direction D1 towards the biasing member 32. Specifically, referring to FIGS. 1-2, contact between the backing tooth 52 and the sealing surface 48 causes the segmented portion 50 of the brush seal assembly 10 to be urged out of the stationary position S, and radially outwardly away from the rotary member 20 such that the backing plate tip 60 will not generally be rubbed by the rotary shaft 20.

The biasing member 32 exerts a biasing force F upon the backing plate 28. The biasing force F is oriented in a direction towards the sealing surface 48 of the rotary member 20. If the backing tooth 52 contacts the sealing surface 48 of the rotary member 20, the respective segmented portion 50 of the brush seal assembly 10 is urged radially outwardly, and towards the biasing member 32. The biasing member 32 exerts the biasing force F towards the sealing surface 48 of the rotary member 20, which re-positions the segment 50 back into the stationary position S.

The backing tooth 52 is employed to reduce or substantially avoid contact between the backing tip 60 and the rotor 20, while also reducing the tip clearance C2 between the backing tip 60 and the sealing surface 48. Specifically, the tip clearance C2 of a backing plate 28 employing the backing tooth 28 is generally less than the tip clearance C2 of a backing plate 28 that does not include the backing tooth 28. The tip clearance C2 should be reduced to the smallest dimension possible to provide axial support to the seal bristles, while still substantially avoiding contact with the rotary shaft 20 through sacrificing the backing tooth 52 in a rub situation. Meanwhile the backing tooth 52 may also work as a backup seal as well While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brush seal assembly, comprising:
  a rotor sealing surface;
  a side plate;
  a machine housing;
  a backing plate operatively coupled proximate an upper surface of the backing plate to the machine housing and located in an initial position and having a backing tip and at least one backing tooth each projecting from a surface of the backing plate, wherein the at least one backing tooth has a tooth surface defining a tooth radially inner diameter and the backing tip having a tip surface defining a tip radially inner diameter, a tooth clearance being measured between the tooth surface radially inner diameter and the rotor sealing surface and a tip clearance being measured between the tip surface radially inner diameter and the rotor sealing surface, and the tooth clearance being less than the tip clearance;
  a plurality of bristles located between the side plate and the backing plate, the plurality of bristles including an end portion for sealing to the rotor sealing surface, and wherein the backing tip abuts against the plurality of bristles, wherein the backing tip directly abuts an end of the plurality of bristles located near the rotor sealing surface; and a biasing member positioned between the machine housing and the backing plate, and contacting both the housing and the backing plate for exerting a biasing force upon the backing plate in a direction towards the sealing surface, the at least one backing tooth configured for contacting the rotor sealing surface.

2. The brush seal assembly of claim 1, wherein backing tip is positioned along the backing plate to provide axial support to the plurality of bristles.

3. The brush seal assembly of claim 1, wherein the brush seal assembly is generally annular and includes a segmented configuration where the plurality of bristles are segmented into discrete portions around a circumference of the brush seal assembly.

4. The brush seal assembly of claim 1, wherein the machine housing is provided for receiving the brush seal assembly, and wherein the machine housing includes a shoulder for engaging a corresponding portion of the backing plate.

5. The brush seal assembly of claim 4, wherein the biasing member is located within a recess of the machine housing.

6. The brush seal assembly of claim 1, wherein the tip clearance ranges from about 0.3 millimeters to about 3.0 millimeters.

7. The brush seal assembly of claim 1, wherein the tooth clearance ranges from about 0.6 millimeters to about 3.4 millimeters.

8. The brush seal assembly of claim 1, wherein the sealing surface is an outer surface of a rotary member.

9. The brush seal assembly of claim 1, wherein the biasing member is one of a leaf spring, a wave spring or a coil spring.

10. A brush seal assembly, comprising:
a rotor sealing surface;
a side plate;
a machine housing;
a backing plate operatively coupled proximate an upper surface of the backing plate to the machine housing and located in an initial position and having a backing tip and at least one backing tooth each projecting from a surface of the backing plate, wherein the at least one backing tooth has a tooth surface defining a tooth inner diameter and the backing tip having a tip surface defining a tip radially inner diameter, a tooth clearance being measured between the tooth surface radially inner diameter and the rotor sealing surface and a tip clearance being measured between the tip surface radially inner diameter and the rotor sealing surface, and the tooth clearance being less than the tip clearance;
a plurality of bristles located between the side plate and the backing plate, the plurality of bristles including an end portion for sealing to the rotor sealing surface, and the backing tip being positioned along the backing plate to provide axial support to and abutting against the plurality of bristles, wherein the backing tip directly abuts an end of the plurality of bristles located near the rotor sealing surface; and
a biasing member positioned between the machine housing and the backing plate, and contacting both the housing and the backing plate for exerting a biasing force upon the backing plate in a direction towards the rotor sealing surface, the at least one backing tooth being configured for contacting the rotor sealing surface.

11. The brush seal assembly of claim 10, wherein the brush seal assembly is generally annular and includes a segmented configuration where the plurality of bristles are segmented into discrete portions around a circumference of the brush seal assembly.

12. The brush seal assembly of claim 10, wherein the machine housing is provided for receiving the brush seal assembly, and wherein the machine housing includes a shoulder for engaging a corresponding portion of the backing plate.

13. The brush seal assembly of claim 12, wherein the biasing member is located within a recess of the machine housing.

14. The brush seal assembly of claim 10, wherein the tip clearance ranges from about 0.3 millimeters to about 3.0 millimeters.

15. The brush seal assembly of claim 10, wherein the tooth clearance ranges from about 0.6 millimeters to about 3.4 millimeters.

16. The brush seal assembly of claim 10, wherein the biasing member is one of a leaf spring, a wave spring or a coil spring.

17. A brush seal segment in a seal assembly, comprising:
a rotary member having a sealing surface;
a side plate;
a machine housing;
a backing plate operatively coupled proximate an upper surface of the backing plate to the machine housing and located in an initial position and having a backing tip and at least one backing tooth each projecting from a surface of the backing plate, wherein the at least one backing tooth has a tooth surface defining a tooth radially inner diameter and the backing tip having a tip surface defining a tip radially inner diameter, a tooth clearance being measured between the tooth surface radially inner diameter and the rotor sealing surface and a tip clearance being measured between the tip surface radially inner diameter and the rotor sealing surface, the tooth clearance being less than the tip clearance;
a plurality of bristles located between the side plate and the backing plate, the plurality of bristles including an end portion for sealing to the rotor sealing surface, the backing tip being positioned along the backing plate to provide axial support to and abutting against the plurality of bristles, the brush seal assembly being generally annular and including a segmented configuration where the plurality of bristles are segmented into discrete portions, wherein the backing tip directly abuts an end of the plurality of bristles located near the sealing surface;
the machine housing for receiving the brush seal assembly, the machine housing including a shoulder and a recess, the shoulder engaging a corresponding portion of the backing plate; and
a biasing member positioned between the machine housing and the backing plate, and contacting both the housing and the backing plate for exerting a biasing force upon the backing plate in a direction towards the sealing surface, the biasing member being located within the recess of the machine housing, the at least one backing tooth being configured for contacting the rotor sealing surface.

18. The brush seal assembly of claim 17, wherein the tip clearance ranges from about 0.3 millimeters to about 3.0 millimeters.

19. The brush seal assembly of claim 17, wherein the tooth clearance ranges from about 0.6 millimeters to about 3.4 millimeters.

* * * * *